United States Patent [19]
Hyslop

[11] Patent Number: 5,927,759
[45] Date of Patent: Jul. 27, 1999

[54] CONNECTION ASSEMBLY FOR AN EXHAUST EXTRACTION SYSTEM

[76] Inventor: William J. Hyslop, 105 Jefferson Valley, Coatesville, Ind. 46121

[21] Appl. No.: 09/109,332

[22] Filed: Jun. 30, 1998

[51] Int. Cl.$^6$ .................................................. F16L 25/00
[52] U.S. Cl. ................................ 285/9.1; 285/62; 285/24; 239/289
[58] Field of Search ............................. 285/9.1, 148.26, 285/417, 369, 62, 24; 239/289, 600; 454/63, 903; 141/383, DIG. 1

[56] References Cited

U.S. PATENT DOCUMENTS

| | | | |
|---|---|---|---|
| 2,733,668 | 2/1956 | Pfetzing | 104/52 X |
| 2,793,057 | 5/1957 | McGugin | 285/9.1 |
| 2,990,198 | 6/1961 | Imming | 285/9.1 |
| 4,102,254 | 7/1978 | Grant | 98/115 |
| 4,699,046 | 10/1987 | Bellieni | 98/115.4 |
| 4,796,520 | 1/1989 | Kramer | 98/15.4 |
| 4,906,032 | 3/1990 | Hohman | 285/319 |
| 5,092,228 | 3/1992 | Pfeiffer et al. | 454/63 |
| 5,096,230 | 3/1992 | Pausch et al. | 285/9.1 |
| 5,162,017 | 11/1992 | Nordin | 454/63 |
| 5,330,234 | 7/1994 | Sweeny | 285/62 |
| 5,362,273 | 11/1994 | Pfeiffer et al. | 454/63 |
| 5,466,900 | 11/1995 | Knapp | 285/62 |
| 5,609,298 | 3/1997 | Hyslop . | |

OTHER PUBLICATIONS

Advertising brochure of Harvey Industries, Inc., 1340 Home Ave., Akron, Ohio 44310 12 pages.
Advertising brochure of Nederman, Inc., P.O. Box 278, McBee SC 29101, Westland, MI 2 pages.
Advertising brochure of Tykron products, Roberts–Gordon, Inc., P.O. Box 44, Buffalo, NY 14240–0044; 241 South Service Road West, Grimsby, Ontario, Canada L3M1Y7 Oct. 1995; 4 pages.
Advertising brochure of Plymovent, 375 Raritan Center Parkway, Edison, NJ 08837; 4 pages.
Advertising brochure of Exhaustomatic Inc., P.O. Box 503444, Indianapolis, IN 46250; 1 page.

*Primary Examiner*—Dave W. Arola
*Attorney, Agent, or Firm*—Woodard, Emhardt, Naughton Moriarty & McNett

[57] ABSTRACT

A connection assembly for an exhaust extraction system which is designed to vent the exhaust from a vehicle tail pipe includes, in combination, three primary components. The first component is an annular sleeve which is constructed and arranged to assemble onto the vehicle tail pipe. A band clamp is used for this connection in order to establish a leak-free interface. Next, there is a nozzle locator ring which slides onto the annular sleeve such that one end of the sleeve extends beyond one side of the nozzle locator ring and the opposite end of the sleeve extends beyond the opposite side of the nozzle locator ring. There is an offset portion intermediate the ends of the annular sleeve which serves as an abutment for the nozzle locator ring. The third major component of the connection assembly is an exhaust nozzle assembly which includes, as its primary components, a generally cylindrical nozzle constructed of a thick walled synthetic material designed for moderate flexibility and a pair of magnet packs located circumferentially 180 degrees apart. The exhaust nozzle assembly is designed to slide onto and fit up against the nozzle locator ring. Once the nozzle is securely seated, the two magnet packs are in position to contact the outer surface of the annular sleeve. Each magnet pack is designed with pole pieces which sandwich a plurality of magnets therebetween and the pole pieces are able to pivot which facilitates the assembly as well as the disassembly of the exhaust nozzle assembly relative to the nozzle locator ring.

14 Claims, 5 Drawing Sheets

CONNECTION ASSEMBLY FOR AN EXHAUST EXTRACTION SYSTEM

BACKGROUND OF THE INVENTION

The present invention relates in general to exhaust extraction systems for emergency vehicles, such as a fire truck or ambulance. More particularly, the present invention relates to the design of a locator ring which is designed to fit over the exhaust system tail pipe of an emergency vehicle and a nozzle assembly which magnetically attaches to the locator ring.

Emergency vehicles, such as a fire truck, create an interesting exhaust-removal challenge due to the nature and manner of use of the vehicle in preparation for an emergency run. A fire truck is usually backed into the fire house garage bay and readied for its next run in this manner. When an alarm call comes in, the engine of the fire truck is started by the driver while he waits for everyone to prepare the equipment and get on board. During this brief time interval before the truck leaves the station, the engine is cold and generates the dirtiest exhaust gases which need to be vented to the outside atmosphere.

The exhaust system of a fire truck is typically arranged so that the "tail" pipe exits from the right side of the truck in front of the rear axle. While this location places the exiting exhaust gases near the center of the fire house, it is an advantageous location for present day exhaust extraction systems. For the most part these present day exhaust extraction systems use a flexible exhaust hose which is connected at one end to the fire truck exhaust pipe and at the opposite end to an overhead duct which leads out of the fire house. A high pressure blower is used to forcibly remove the exhaust gases from the fire house. A hose adapter or nozzle assembly of some type is typically used to connect the flexible hose to the exhaust pipe. With secure and sealed connections and so long as there are no perforations or open seams in the exhaust extraction system, all of the vehicle exhaust gases will be safely vented out of the fire house and into the atmosphere.

The use of a flexible hose to remove exhaust gas from a running engine is not new. Automobile mechanics have used such hoses for years. However, there is one important difference between use by a mechanic and use as part of an exhaust extraction system which is attached to an exhaust pipe of a fire truck. Once everyone is onboard the fire truck, it is ready to leave the fire house and there is usually no one left to disconnect the exhaust hose from the exhaust pipe. Even if personnel were left behind, safe handling of the vehicle exhaust would dictate that the vehicle be pulled out of the fire house and then have the hose removed. This would involve a start up and stop procedure at the very time the fire truck is trying to leave quickly on the emergency run. Even if someone was left behind and could disconnect the exhaust hose prior to the fire truck departing, this would allow exhaust gas to be dispersed into the fire house, the very event which exhaust extraction systems are designed to prevent.

In order to address this disconnect concern, present day exhaust extraction systems try to provide an automatic disconnect feature such that the adapter or nozzle connecting the flexible hose to the exhaust pipe comes off automatically after the fire truck has actually left the fire house. While present exhaust extraction systems which are offered commercially have approached this design challenge in slightly different ways, most systems provide an extra length of flexible hose which is held by a saddle and suspended from an overhead track by means of a spring-biased balancer. The spring-biased balancer supports the hose and the induced spring-tension force facilitates the release of the hose from the exhaust pipe as the fire truck leaves the fire house. As the fire truck begins to pull out of the fire house, the distance between the exhaust pipe and the duct work connection increases. This pulls on the flexible hose which in turn pulls the balancer down the track toward the door. The loop of excess hose between the balancer saddle and the duct hose connection allows this movement. When the balancer reaches the track stop, the balancer cable begins to uncoil which increases the resisting spring force. At some point, the resisting spring force of the balancer becomes greater than the force needed to separate the adapter from the exhaust pipe. Continued travel of the fire truck causes the hose adapter/nozzle to separate from the exhaust pipe.

The following companies have offered exhaust extraction systems which, for the most part, can be said to function in the manner which has been described: Harvey Industries, Inc., 1340 Home Avenue, Buildings F and G, Akron, Ohio 44310-2580; Nederman, Inc., P. O. Box 278, McBee, S.C. 29101, Westland, Mich.; Tykron, 241 South Service Road, Grimsby, Ontario L3M 1Y7, Canada; Plymovent, 375 Raritan Center Parkway, Edison, N.J. 08837; and Exhaustomatic, Inc., P. O. Box 503444, Indianapolis, Ind. 46250.

While many of the exhaust extraction systems offered by these listed companies are directed to solving the same problem, and while they can be said to generally perform in the same way, there are various design differences and different features which are offered. The overhead track and duct components, the balancer and the flexible hose are fairly well developed and would be considered as fairly mature technology. The "tail" pipe adapter though is an area of greater design attention. The desire is to provide a design which can be easily and securely attached to the exhaust pipe in order to connect the extraction system and yet release in a predictable and reliable manner without damage to the nozzle adapter, flexible hose, or the exhaust pipe, or for that matter any other portion of the vehicle or fire house.

The exhaust extraction system of Harvey Industries, Inc. connects the flexible hose to the exhaust pipe by a spring loaded clamp which is mounted on and extends through the nozzle. The nozzle is removed from the exhaust pipe when the balancer resisting spring force overcomes the clamp spring. The nozzle does not provide a seal around the exhaust pipe, but it does permit for ambient air to enter the nozzle.

An earlier exhaust extraction system which was offered by Nederman, Inc. provided an electromagnetic attachment where a magnet attached to the side of the fire truck and held the nozzle opening at the exhaust pipe height. The nozzle did not provide a seal around the exhaust pipe but it did allow ambient air to enter the nozzle. In those fire station arrangements which used front and rear doors for a pass through bay, this system was not suitable. More recently this company has created a pneumatic system.

An earlier exhaust extraction system which was offered by Tykron used a nozzle with a tension spring which rested in a groove inside the nozzle and surrounded the exhaust pipe. The nozzle spring did not provide a seal around the exhaust pipe, nor did it allow the maximum amount of air to enter in relation to its inside diameter size.

The exhaust extraction system of Plymovent uses a pneumatic bladder nozzle attachment concept. The bladder has three compartments and provides three points of pressure contact but does not form a complete seal around the exhaust pipe. The pneumatic bladder nozzle allows a very small volume of air to enter, but does not permit the maximum amount of air to enter. Consequently, with respect to the nozzle inside diameter size, this does not allow the complete system to operate at the lowest possible temperature. The described pneumatic system requires an air compressor, air filter and lubricator, air lines, controls, and the pneumatic bladder which adds to the overall cost and complexity of the system. It is believed that air leaks are a problem with this system and further, if the fire truck leaves the station at too fast a speed and the air has not been bled out of the nozzle bladder, the flexible hose can be damaged. Since there is a partial seal on the exhaust pipe, this can cause a two cycle turbocharger on a diesel engine to rotate without lubrication when the exhaust blower operates and all engines connected to the system are not running.

The exhaust extraction system of Exhaustomatic, Inc. actually has four variations as far as securing the nozzle to the exhaust pipe. Their product literature indicates that the four nozzle designs include a clamp design, permanent magnet design, electromagnetic design, and a pneumatic design. It is believed though that in these designs the nozzle does not provide a complete seal on the exhaust pipe. However, these designs do allow ambient air to enter and provide some system cooling, except when the pneumatic nozzle is used.

With these earlier designs defining the state of the art in the early 1990's, the invention of U.S. Pat. No. 5,609,298 was conceived. U.S. Pat. No. 5,609,298, which issued Mar. 11, 1997 to Hyslop, discloses a magnetically-attached exhaust nozzle assembly which includes an annular nozzle locator ring which is designed to slide over and secure to the exhaust pipe of a fire truck. The nozzle locator ring includes an inner sleeve which fits closely against the outside diameter of the exhaust pipe and an outer sleeve which receives a flexible exhaust nozzle. The exhaust nozzle is integrally connected with a flexible hose of the extraction system and establishes sealing engagement at two locations on the nozzle locator ring. There is axial sealing by abutment up against a flange of the nozzle locator ring and circumferential or radial sealing due to the fit of the nozzle on the outside surface of the outer sleeve. The flexible exhaust nozzle includes a guide rail which helps with the initial alignment and a magnet housing which ultimately attaches by magnetic attraction to the surface of the exhaust pipe for securely holding the nozzle in position. A spring-biased locator pin helps to keep the magnets of the magnet housing spaced from the exhaust pipe during initial assembly.

The '298 Hyslop patent recognizes that what is desired from this type of invention is a nozzle design which readily and easily attaches to the vehicle exhaust pipe in a properly aligned fashion. Also recognized by the '298 Hyslop patent is the desirability of a quick disconnect between the nozzle and the nozzle locator ring without any undue load or stress on any portion of the vehicle or on any portion of the exhaust extraction system. According to the teachings of the present invention, improvements have been made to the device described in the '298 Hyslop patent. These improvements make the connection assembly disclosed herein easier to use and these improvements provide a more reliable structure.

SUMMARY OF THE INVENTION

A connection assembly for an exhaust extraction system which is designed to vent the exhaust from a vehicle tail pipe according to one embodiment of the present invention comprises in combination a sleeve which is constructed and arranged to assemble onto the vehicle tail pipe, a nozzle locator ring which is constructed and arranged to assemble onto the sleeve, such that the sleeve extends through the nozzle locator ring, and an exhaust nozzle assembly which is constructed and arranged to assemble onto the nozzle locator ring, the exhaust nozzle assembly including a nozzle and a magnet pack which is attached to the nozzle which is constructed and arranged to magnetically attach the nozzle to the sleeve when the exhaust nozzle assembly is assembled onto the nozzle locator ring.

One object of the present invention is to provide an improved connection assembly for an exhaust extraction system.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
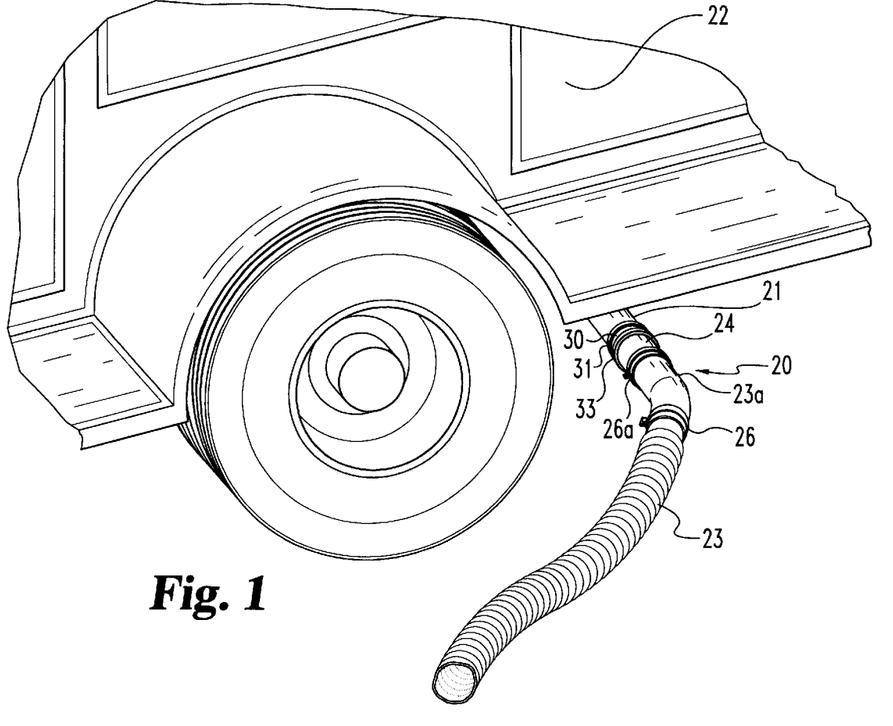
FIG. 1 is a perspective view of a connection assembly for an exhaust extraction system according to a typical embodiment of the present invention.
Figure 2:
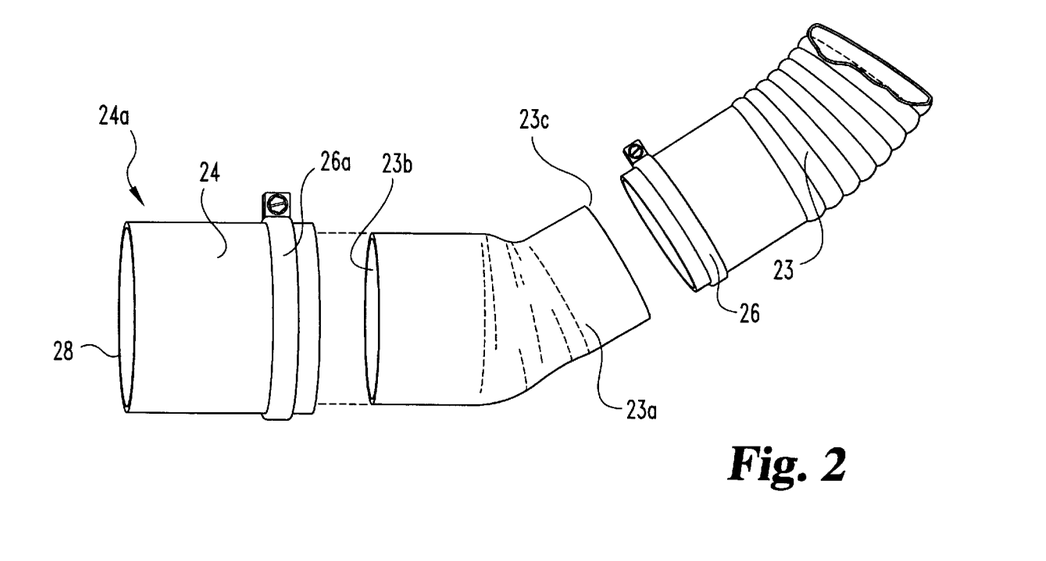
FIG. 2 is an exploded, side elevational view of a nozzle assembly which comprises one part of the FIG. 1 connection assembly as connected to an elbow and flexible hose.

Referring to FIGS. 1 and 2 there is illustrated a portion of an exhaust extraction system 20 which is connected to the exhaust pipe 21 of a fire truck 22. The flexible hose 23 of the exhaust extraction system 20 terminates at a 45 degree metal elbow 23a and hose 23 is connected and secured to elbow 23a by means of annular band clamp 26. One generally cylindrical end 23b of elbow 23a fits inside of the flexible, generally cylindrical rubber nozzle 24 and is securely connected therewith by annular band clamp 26a. A nozzle locator ring 33 is securely attached to the exhaust pipe 21 by way of a connecting sleeve 30 and remains fixed thereto. The free end 28 of nozzle 24 fits over one end of the nozzle locator ring 33 and this interface denotes the point of separation when the exhaust extraction system disconnects from the fire truck 22. As will be explained and described, two magnet packs are assembled into nozzle 24 so as to create a nozzle assembly 24a.

The exhaust pipe 21 is configured so as to extend from the right side of the fire truck 22, near the rear axle. The exhaust pipe 21 is typically cylindrical, and it is often fitted with an angled extension in order to direct the exhaust toward the right rear wheel. Earlier extraction systems would often cut, modify, and angle the exhaust pipe at a 45 degree angle. This tended to facilitate the ease of separation of the nozzle from the exhaust pipe when the fire truck leaves the fire house. As will be explained hereinafter, the exhaust pipe is modified for cooperation with the present invention by being shortened. According to the present invention, a cylindrical connecting sleeve is used and is fitted around the end portion of the shortened exhaust pipe. The sleeve replaces the portion of the exhaust pipe that was cut off or removed and the sleeve extends the exhaust pipe approximately one inch beyond the side of the fire truck 22. Size variations are offered for the sleeve, nozzle locator ring, and nozzle assembly of the present invention in order to adapt the sleeve, nozzle locator ring, and nozzle assembly to the specific size of the vehicle exhaust pipe.

The remainder of the exhaust extraction system 20 which is not illustrated in FIG. 1 can assume a variety of configurations, depending on the specific brand or model which is being used in the particular fire house. However, a typical exhaust extraction system will include a high pressure blower, a round sealed duct, flexible hose of adequate length to extend between the system and the vehicle as it leaves the fire house, a saddle, a hose support balancer, and a cooperating balancer track. Since existing exhaust extraction systems which are available commercially are believed to be well known to persons of ordinary skill in this field, the system details need not be illustrated. Various companies have been identified which offer such systems and their product literature illustrates to some extent these other components and confirms that these exhaust extraction systems are well known to persons of ordinary skill. Further, the only aspect of such commercial systems which is applicable to the present invention is the flexible hose 23. The flexible hose 23 and the end of the hose which terminates into nozzle 24 will typically have the same size, shape, and overall configurations, regardless of the exhaust extraction system.

With continued reference to FIG. 2, the details of the connection of nozzle 24 to hose 23 via elbow 23a are provided. Nozzle 24 is a hollow, generally cylindrical member which is closely fitted around end 23b. Clamp 26a is tightened so that the nozzle-to-elbow connection is leak-free. The flexible hose 23 is closely fitted over the smaller end 23c of the elbow 23a. Clamp 26 is tightened so that the hose-to-elbow connection is leak-free.

It is also to be noted that nozzle 24 has a relatively thick wall but it is still flexible and able to be manually shaped, to some extent, as it is pushed onto the nozzle locator ring 33.

Figure 3:
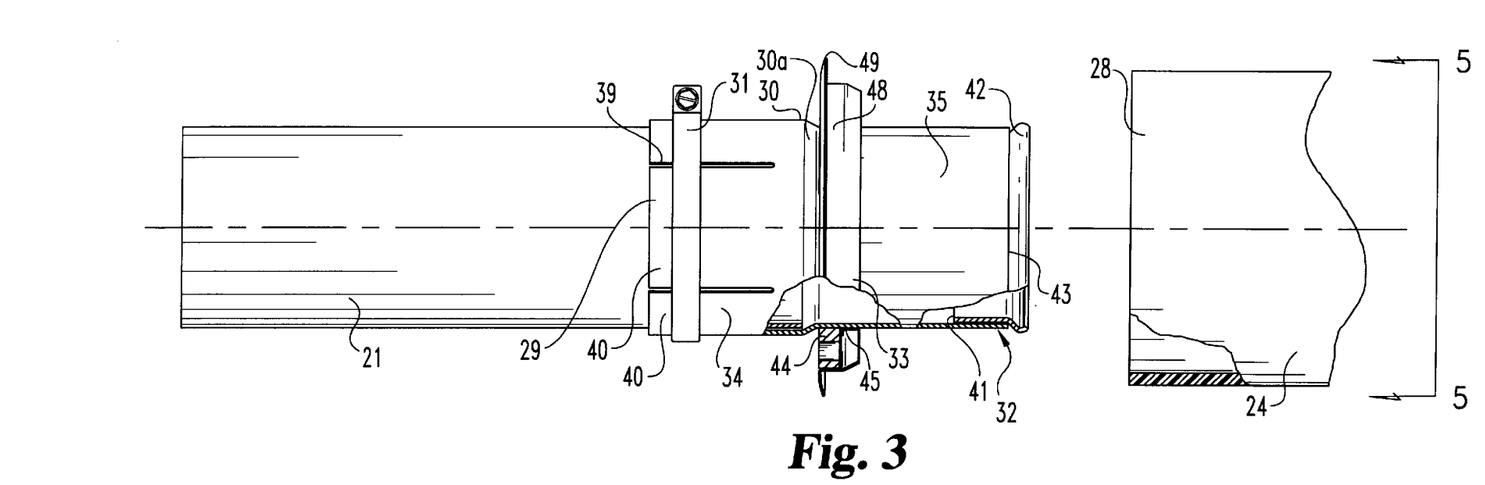
FIG. 3 is an exploded, side elevational view of a sleeve and nozzle locator ring which comprise other portions of the FIG. 1 connection assembly.

The assembly of the primary components associated with the present invention is illustrated in FIG. 3. As illustrated in this exploded view, the exhaust pipe 21 inserts into a first end 29 of sleeve 30 and is secured by annular band clamp 31. The nozzle 24 extends over the opposite end 32 of the sleeve and fits snugly onto the body of the nozzle locator ring 33. Sleeve 30 is a one-piece member with a larger diameter portion 34 on one side of ring 33 and a smaller diameter portion 35 on the opposite side of ring 33 with an angled offset portion 30a between portions 34 and 35. End 29 of portion 34 is configured with six slots 39 which ease the fit and the insertion of the exhaust pipe 21 into end 29. Once the exhaust pipe 21 is securely and fully inserted into end 29, clamp 31 is tightened which is achieved by reducing the diameter size. The six individual prongs 40, which are defined by the six slots 39, close in on the outside diameter surface of the exhaust pipe as the clamp 31 is tightened.

At the opposite end 32 of sleeve 30, an extension sleeve 41 is spot welded to the inside diameter surface of portion 35. Sleeve 41 has a cylindrical portion which fits inside end 32 and an outwardly flared, conical portion 42 which extends beyond the free edge 43 of portion 35. Ring 33 includes an outer annular ring 33b and an interior aperture ring 33c which is securely joined to ring 33b. Ring 33c includes a pattern of eighteen apertures 33a (see FIG. 9) which are covered by an interior flapper 44 (see FIG. 8). For a six-inch diameter nozzle 24, there are eighteen apertures. For an eight-inch diameter nozzle, a larger number of apertures are used, preferably twenty-three. The aperture 33a shape is preferably a D-shape to leave clearance for the clamping area for the flapper 44 without restricting the flow area. The flapper 44 is clamped in position by annular flange 45. The secure clamping of the flapper between ring 33c and flange 45 is achieved by spot welding the annular flange 45 directly to the outside diameter surface 35a of portion 35. Once flange 45 is spot welded directly, an assembly is created consisting of sleeve 30, ring 33, flapper 44, flange 45, and sleeve 41. Due to the offset portion 30a, ring 33 cannot move off of sleeve 30 in the direction of portion 34. Due to flange 45, the ring 33 cannot move in the direction of portion 35.

The inside diameter of nozzle end 28 is sized so as to easily slide over portion 42 with ample clearance (⅞ inch on a side) so as to avoid any interference. Two magnet packs (assemblies) are attached to the inside surface of nozzle end 28 which create magnetic attraction on the outer surface of portion 35. The method of attaching nozzle 24 onto the nozzle locator ring 33 is described hereinafter. In the context of the present invention, the exhaust extraction system connection assembly includes as the main components sleeve 30, nozzle locator ring 33, flapper 44, and nozzle assembly 24a.

Figure 4:
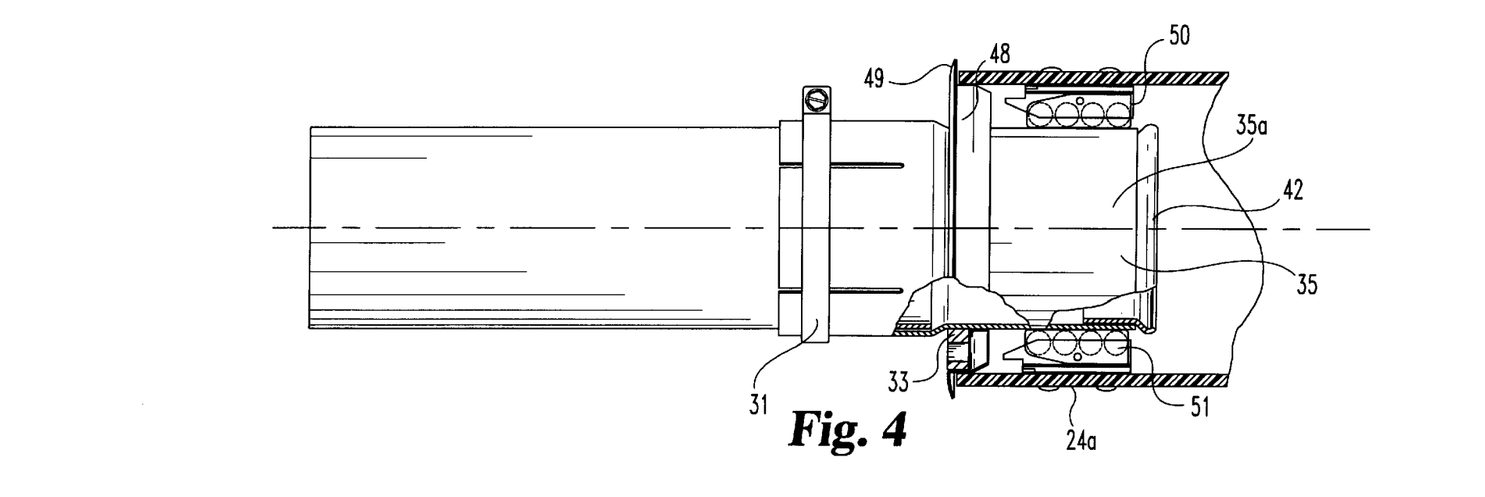
FIG. 4 is a fragmentary, top plan view of the FIG. 2 nozzle assembly assembled to the FIG. 3 nozzle locator ring and the FIG. 3 sleeve.
Figure 5:
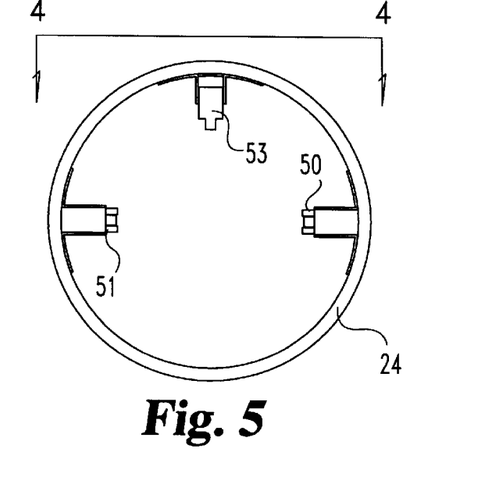
FIG. 5 is an end elevational view of the FIG. 2 nozzle assembly.
Figure 6:
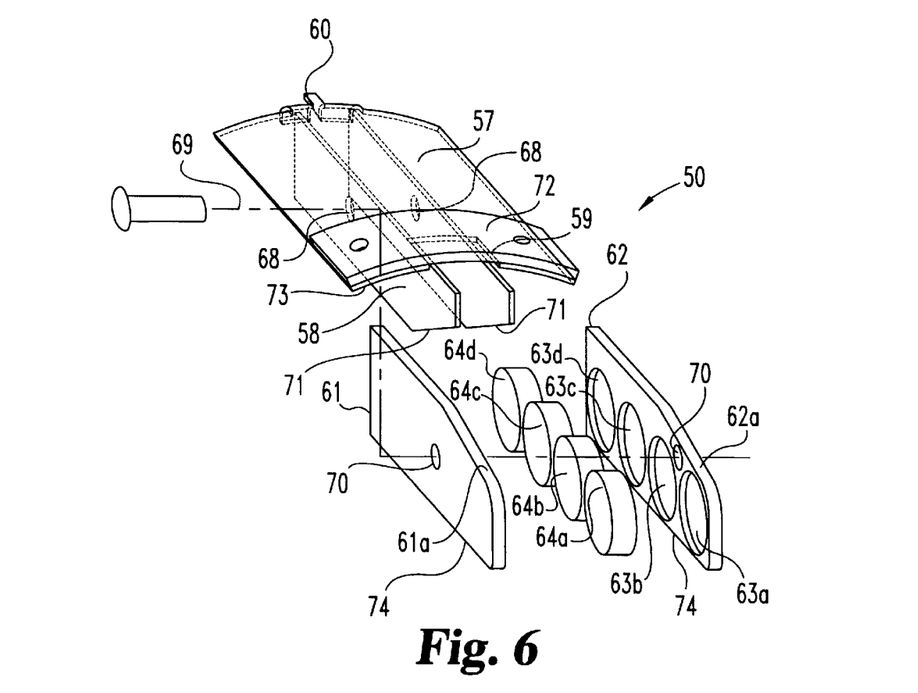
FIG. 6 is an exploded view of one magnet pack which comprises a portion of the FIG. 2 nozzle assembly as illustrated in FIG. 5.
Figure 6A:
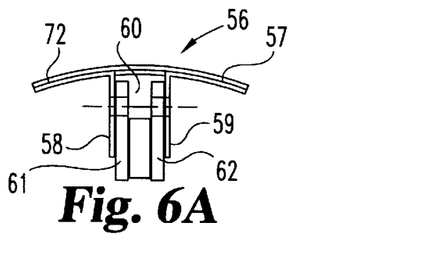
FIG. 6A is an end elevational view of the assembled FIG. 6 magnet pack.
Figure 7:
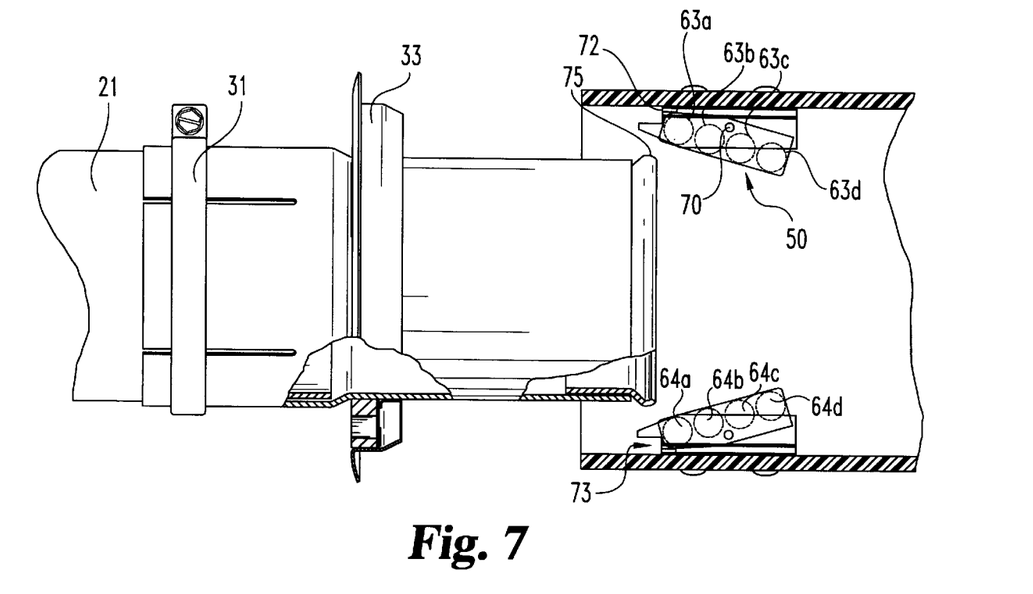
FIG. 7 is a fragmentary, side elevational view of the FIG. 2 nozzle assembly as being installed onto the nozzle locator ring and sleeve combination of FIG. 3.
Figure 7A:
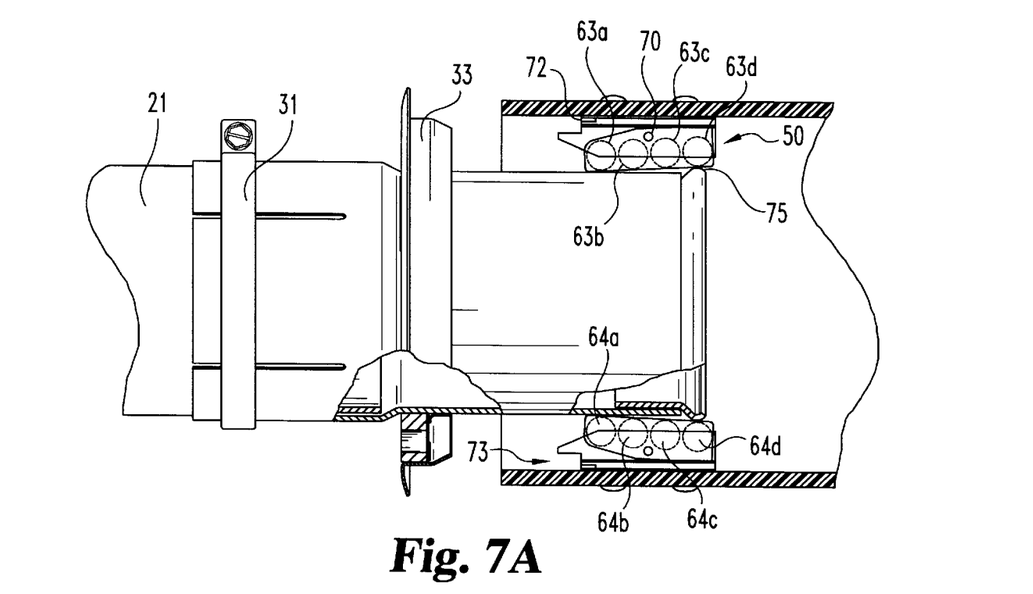
FIG. 7A is a fragmentary, side elevational view of the FIG. 7 assembly procedure at a later point in time prior to when the nozzle assembly is fully assembled.
Figure 8:
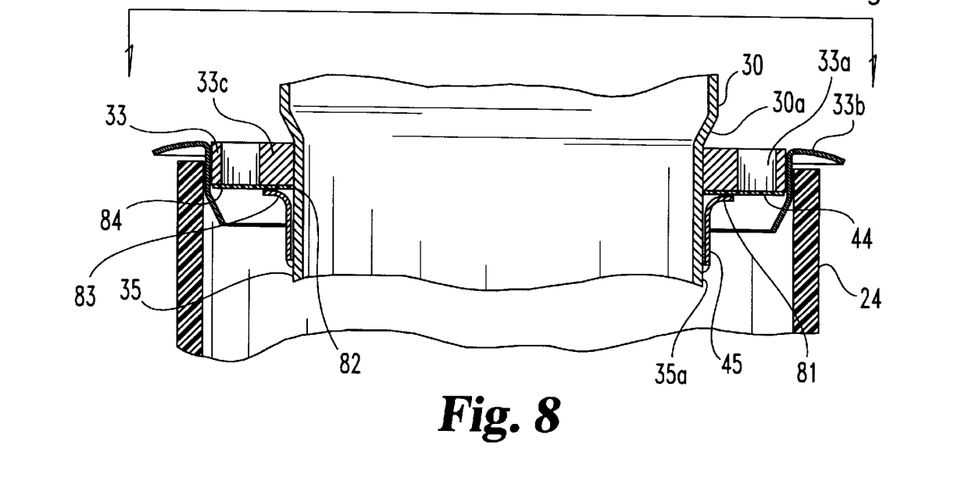
FIG. 8 is a side elevational view in full section of the nozzle locator ring of FIG. 3 illustrating its assembly onto the FIG. 3 sleeve.
Figure 9:
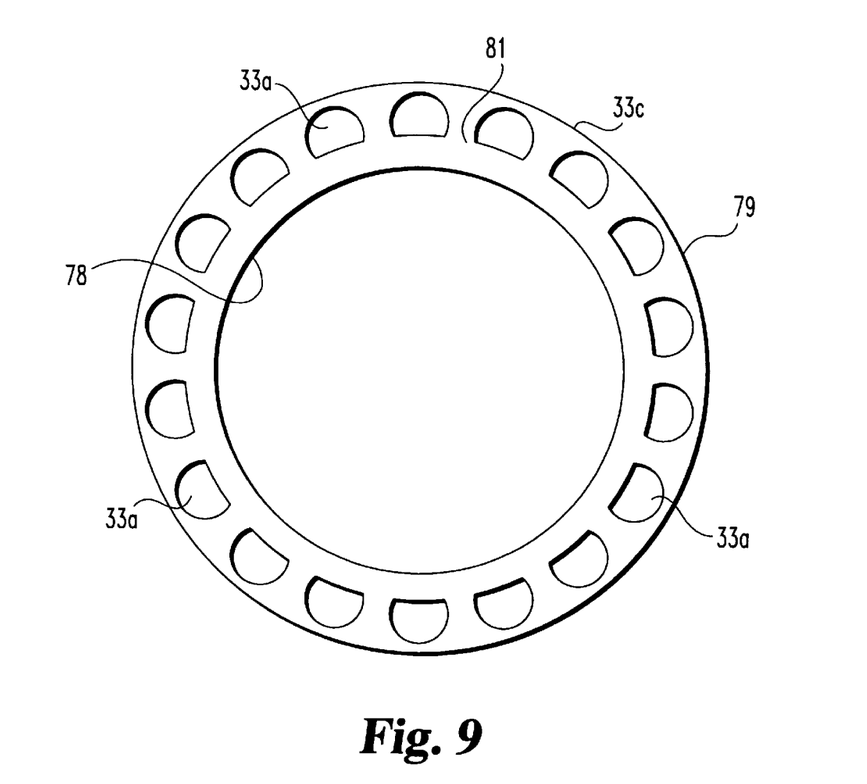
FIG. 9 is a top plan view of an annular ring component comprising one part of the nozzle locator ring of FIG. 8.

The final assembled condition of nozzle 24 (nozzle assembly 24a) onto nozzle locator ring 33 is illustrated in FIG. 4. As is illustrated, nozzle assembly 24a slides onto the nozzle locator ring 33 and nozzle end 28 fits snugly around body portion 48 of ring 33b and abuts up against the outer annular flange portion 49 of ring 33b. In this assembled orientation, end 32 and sleeve 41 are located in the hollow interior of nozzle 24. The two magnet packs 50 and 51 are located between portion 42 and ring 33b and establish magnetic attraction contact directly onto the outer cylindrical surface 35a of portion 35. The two magnet packs 50 and 51 are located approximately 180 degrees apart, see FIG. 5. Located between and at a location 90 degrees apart from the two magnet packs is a guide 53. Looking through nozzle 24 toward end 28 as depicted in FIG. 5, the two magnet packs 50 and 51 are at locations corresponding to the three o'clock and nine o'clock positions on the face of a clock. The guide 53 is located at the twelve o'clock position. The detailed construction of the ring 33, flapper 44, and flange 45 is illustrated in FIGS. 8 and 9. The detailed construction and assembly of one magnet pack 50 is illustrated in FIGS. 6, 6A, 7, and 7A. The other magnet pack 51 has a construction and assembly which is virtually identical to that illustrated for magnet pack 50.

With continued reference to FIGS. 6, 6A, 7, and 7A, it will be appreciated that magnet pack 50 includes a stainless steel case 56 which has a curved base 57, opposing side panels 58 and 59, and end panel 60. The interior defined by base 57 and panels 58–60 is hollow and designed to receive a plurality of magnets which are fixed in position by being sandwiched between a pair of opposing pole plates 61 and 62. Each pole plate 61 and 62 includes four spaced-apart, blind circular holes 63a–63d, each measuring approximately ⅝ inch in diameter and approximately 0.10 inches deep. Each of these blind holes 63a–63d is designed to receive and capture a corresponding cylindrical magnet 64a–64d. The hollow interior of case 56 is wide enough to accept a magnet subassembly which includes four magnets 64a–64d arranged side-by-side and sandwiched between plates 61 and 62 and fixed in spaced relation to one another by the four blind holes 63a–63d in each pole plate.

The opposing side panels 58 and 59 each define a pivot hole 68 which is aligned and centered on a corresponding pivot axis 69. Each pole plate 61 and 62 also includes a pivot hole 70 which is used in cooperation with a fastener to fix the magnet subassembly within case 56 and allow the magnet subassembly (pole plates 61 and 62 plus the four cylindrical magnets 64a–64d) to pivot relative to case 56. While the fit of the magnet subassembly within case 56 between side panels 58 and 59 is close, there is sufficient clearance in the width stack up of dimensions and tolerances for the magnet subassembly to be able to pivot freely without any interference or drag. The pole plates are made up of a magnetically-attractive material, while the case 56 is not magnetically attractive.

The leading edge 71 of each side panel 58 and 59 is inclined in the direction of curved base 57 which abuts up against the curved inside surface of end 28 of nozzle 24. The inclined taper of edge 71 creates a wider dimension clearance for conical portion 42 to slide past the two magnet packs 50 and 51. In order to also pivot the magnet subassembly away from the conical portion, a magnetically-attractive metallic piece 72 is attached to curved base 57 at a location adjacent to end 73. Each of the two pole plates 61 and 62 have a tapered edge 61a and 62a, respectively, which is provided as a way to facilitate the pivoting of the magnet subassembly toward metallic piece 72. This positions the innermost edge 74 of each pole plate on an incline. It is this inclined edge 74 which slides along the outermost edge 75 of conical portion 42 as the nozzle 24 is pushed onto the nozzle locator ring 33. By fabricating the extension sleeve 41 out of stainless steel, there is no magnetic attraction of the pole plates to the conical portion 42 as the pole plates (edges 74) slide across edge 75.

As the nozzle end 28 becomes fully seated on body portion 48 of ring 33b and abuts up against flange portion 49, the pole plates 61 and 62 have moved longitudinally to a point along portion 35 of sleeve 30 beyond the conical portion 42 of extension sleeve 41 and as this occurs, the pole plates 61 and 62 change from point contact to full area contact by the lower (innermost) edge 74 of each pole plate 61 and 62 against surface 35a of portion 35. With reference to a clock face or dial, the two magnet packs are located at three o'clock and nine o'clock positions based up on looking inwardly at the extension sleeve 41 from the direction of nozzle 24, see FIGS. 1 and 5.

The fully assembled combination of nozzle assembly 24a, nozzle locator ring 33, flapper 44, flange 45, sleeve 41, sleeve 30, and exhaust pipe 21 as described herein represents the exhaust extraction system configuration when the fire truck is parked and ready for a run. When a call comes in and the fire truck is started, exhaust is generated and flows from the exhaust pipe, through the sleeve 30, and exits by way of the nozzle assembly 24a and the remainder of the exhaust extraction system. As the truck pulls out of the fire house, the desire is to have the nozzle assembly disconnect from the nozzle locator ring 33 which remains securely connected to the vehicle exhaust pipe. As described, it may be desirable or necessary to shorten the original exhaust pipe to either reduce the length or to remove any angled or bent portions, or both.

When the fire truck leaves the fire house, the exhaust extraction system will ultimately place a tension force on the flexible hose. The force vectors are such due to the overhead arrangement of the extraction system, and in particular the ratchet balancer and track, that the nozzle will experience both an upward pulling force as well as rearward pulling force. The adjustable track stop releases the ratchet and the upward ratchet balancer spring bias force pulling on the end of the nozzle which is connected to the flexible hose pivots the magnets out of engagement with the exhaust pipe. This pivoting direction of separation is easier to accomplish than either full axial or lateral separation of the magnets due to the direction of the lines of flux and the relative ease or difficulty in breaking those lines of magnetic flux. The rocking or pivoting action allows the magnets to disengage quite easily and also clear conical portion 42, even though the pole pieces are in the down position. However, at the same time, if only axial forces were present, the force level required to separate the magnet housing from the exhaust pipe would be significant. Therefore, when the fire truck is moving forward, through a pass-through bay to the stand-by position or is backing into the stand-by position, the axial forces will have to break the contact before the pole pieces 61 and 62 will clear the conical edge 42 of sleeve 41. Also the turbocharger exhaust force would have to be able to break the axial force so that the pole pieces 61 and 62 can clear the conical portion 42 of sleeve 41 before the nozzle assembly 24a could be blown off of the exhaust pipe.

As the magnetic bond onto the exhaust pipe is broken, the axial force vectors pull the nozzle assembly off of the locator ring. This procedure allows the nozzle assembly to be securely retained at all times and yet separate easily when the fire truck is leaving the fire house.

When the truck returns to the fire house, the nozzle assembly 24a is being supported approximately two feet off the floor by the fully retracted ratchet balancer. To install the nozzle, the saddle is lowered and the balancer ratchet is set. Setting the ratchet removes the lifting spring bias pressure of the balancer on the nozzle. The nozzle assembly 24a can be readily reattached by locating the name plate on the exterior of nozzle 24 at approximately the 12 o'clock position. The name plate location generally coincides with the location of guide 53.

With further reference to FIGS. 8 and 9, the pattern of eighteen equally-spaced apertures 33a is coaxially between the inside diameter surface 78 of ring 33c and the outside diameter surface 79. The rubber flapper 44 lies across surface 81 so as to completely cover each aperture 33a. The inside diameter edge 82 of flapper 44 is clamped against surface 81 by the unitary annular flange 45. Flange 45 includes a compressing annular flange portion 83 and a cylindrical sleeve which fits around portion 35 and is spot welded to the outer surface 35a. As would be understood from this described and illustrated structure, the flapper 44 creates a one-way air flow restricter. Air flowing from the atmosphere into apertures 33a will push against flapper 44, causing it to deflect away from the apertures 33a and away from surface 81, thereby allowing the ambient air to enter the nozzle assembly 24a and subsequently blend with the exhaust exiting from the exhaust pipe 21. The blending of ambient air with the hot exhaust tends to lower the overall temperature of the exhaust which is being routed out of the fire house by the flexible hose 23. A lower overall temperature is easier on the nozzle and flexible hose and contributes to their longer life. Ambient air is drawn in through apertures 33a whenever the blower of the exhaust extraction system starts. Ambient air may also be drawn in through any pressure differences or a possible venturi effect of exhaust flowing from the exhaust pipe.

In the reverse direction, any air or exhaust gas which might tend to backflow from the nozzle back to the atmosphere will be blocked by flapper 44. The flow of air or exhaust gas inside of nozzle assembly 24a will simply push against the flapper, pushing it back toward apertures 33a and outer edge 84 up against surface 81. The flexibility of the rubber flapper 44 enables it to seal up against the apertures 33a and/or up against surface 81, preventing any backflow out through the apertures 33a.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A connection assembly for an exhaust extraction system which is designed to vent the exhaust from a vehicle tail pipe, said connection assembly comprising, in combination:
    an annular sleeve constructed and arranged to assemble onto the vehicle tail pipe and including a first end;
    a nozzle locator ring constructed and arranged to assemble onto said annular sleeve, said annular sleeve extending through said nozzle locator ring;
    a removable exhaust nozzle assembly constructed and arranged to both assemble onto said nozzle locator ring and disengage therefrom, said exhaust nozzle assembly including a nozzle and a magnet pack which is attached to said nozzle and which is constructed and arranged to magnetically attach said nozzle to said annular sleeve when said exhaust nozzle assembly is assembled onto said nozzle locator ring; and
    an inner sleeve inserted into said annular sleeve and being securely attached thereto, said inner sleeve including a conical portion which is positioned beyond said first end and which serves as a guide for said magnet pack during assembly and disengagement of said exhaust nozzle assembly.

2. The connection assembly of claim 1 wherein said annular sleeve includes a larger diameter portion at one end and a smaller diameter portion at an opposite end with an offset portion therebetween, said nozzle locator ring being positioned adjacent said offset portion.

3. The connection assembly of claim 2 wherein said exhaust nozzle assembly includes two magnet packs which are each assembled to said nozzle approximately 180 degrees apart.

4. The connection assembly of claim 3 wherein each magnet pack includes a housing, a plurality of magnets, and moveable pole pieces positioned between said housing and said plurality of magnets.

5. The connection assembly of claim 4 wherein said pole pieces each include a common pivoting axis and are mounted on a pivot pin which is secured by said housing.

6. The connection assembly of claim 5 wherein said magnet packs are located between said conical end and said nozzle locator ring when said exhaust nozzle assembly is assembled onto said nozzle locator ring.

7. The connection assembly of claim 1 wherein said exhaust nozzle assembly includes two magnet packs which are each assembled to said nozzle approximately 180 degrees apart.

8. The connection assembly of claim 7 wherein each magnet pack includes a housing, a plurality of magnets, and moveable pole pieces positioned between said housing and said plurality of magnets.

9. The connection assembly of claim 8 wherein said pole pieces each include a common pivoting axis and are mounted on a pivot pin which is secured by said housing.

10. The connection assembly of claim 1 wherein said magnet pack is located between said conical end and said nozzle locator ring when said exhaust nozzle assembly is assembled onto said nozzle locator ring.

11. An exhaust nozzle assembly for connection to a nozzle locator ring which is assembled to a sleeve which is connected to a vehicle tail pipe as part of an exhaust extraction system comprises:
    a generally cylindrical nozzle constructed and arranged to fit onto said nozzle locator ring;
    a pair of oppositely-disposed magnet packs attached to an inside surface of said nozzle, each magnet pack including a housing, a plurality of individual magnets, and a pair of oppositely-disposed pole pieces which are positioned within said housing and which are on opposite sides of said plurality of magnets; and
    a pivot pin extending through each of said pole pieces with opposite ends of said pivot pin received by said housing for enabling the pivoting of said pole pieces and said magnets relative to said housing.

12. A magnet pack for use in attaching an exhaust nozzle assembly onto an annular sleeve which is attached to a vehicle tail pipe as part of an exhaust extraction system for a corresponding vehicle, said magnet pack comprising:
    a case including a base and a pair of spaced-apart side panels, each of said panels having a leading edge;
    a pair of spaced-apart pole plates;
    a plurality of magnets positioned between said pair of spaced-apart pole plates wherein the assembly of said pole plates and said plurality of magnets is positioned between said side panels;
    pivot means for enabling the pivoting of the pole plates and magnets assembly relative to said case, said pivot means including a corresponding hole defined by each side panel, a corresponding hole defined by each pole plate, and a pin extending through all four corresponding holes; and
    the leading edge of each side panel being inclined toward said base for the purpose of creating increased clearance relative to said annular sleeve for the ease of assembly.

13. The magnet pack of claim 12 wherein each pole plate includes a plurality of generally cylindrical recesses and wherein each of said plurality of magnet is generally cylindrical and is constructed and arranged to fit within a corresponding one of said generally cylindrical recesses.

14. A magnet pack for use in attaching an exhaust nozzle assembly onto an annular sleeve which is attached to a vehicle tail pipe as part of an exhaust extraction system for a corresponding vehicle, said magnet pack comprising:

a case including a base and a pair of spaced-apart side panels, each of said side panels having a leading edge;

a pair of spaced-apart pole plates;

a plurality of magnets positioned between said pair of spaced-apart pole plates wherein the assembly of said pole plates and said plurality of magnets is positioned between said side panels;

pivot means for enabling the pivoting of the pole plates and magnets assembly relative to said case; and the leading edge of each side panel being inclined toward said base for the purpose of creating increased clearance relative to said annular sleeve for the ease of assembly.

* * * * *